(12) United States Patent
Wyma

(10) Patent No.: US 11,394,236 B2
(45) Date of Patent: Jul. 19, 2022

(54) MODULAR POWER SYSTEMS

(71) Applicant: ENATEL, Christchurch (NZ)

(72) Inventor: Murray Raymond Wyma, Christchurch (NZ)

(73) Assignee: ENATEL, Christchurch (NZ)

( * ) Notice: Subject to any disclaimer, the term of this patent is extended or adjusted under 35 U.S.C. 154(b) by 452 days.

(21) Appl. No.: 16/149,734

(22) Filed: Oct. 2, 2018

(65) Prior Publication Data

US 2019/0103761 A1   Apr. 4, 2019

(51) Int. Cl.
*H02J 9/06* (2006.01)
*H02J 7/00* (2006.01)
*H01M 10/42* (2006.01)

(52) U.S. Cl.
CPC ............ *H02J 9/061* (2013.01); *H02J 7/0021* (2013.01); *H01M 10/4257* (2013.01)

(58) Field of Classification Search
CPC ...... H02J 9/06; H02J 7/0021; H01M 10/4257; Y02E 60/10
See application file for complete search history.

(56) References Cited

U.S. PATENT DOCUMENTS

| | | | |
|---|---|---|---|
| 10,090,698 B2 | 10/2018 | Melin | |
| 2002/0085399 A1* | 7/2002 | Brooks | H02J 1/06 363/65 |
| 2005/0146223 A1* | 7/2005 | Kanouda | H02J 9/062 307/66 |
| 2007/0278860 A1* | 12/2007 | Krieger | H02J 9/061 307/64 |
| 2017/0279170 A1* | 9/2017 | O'Hora | H02J 7/0042 |

FOREIGN PATENT DOCUMENTS

WO   2017211418 A1   12/2017

* cited by examiner

*Primary Examiner* — Hal Kaplan
*Assistant Examiner* — Thai H Tran
(74) *Attorney, Agent, or Firm* — Withrow & Terranova, P.L.L.C.; Vincent K. Gustafson

(57) ABSTRACT

Modular power systems, smart battery modules, and monitoring and control systems are described herein. The modular power system comprises at least one mains converter connected between a mains supply and a DC bus, a monitoring and control system connected to the DC bus, and a plurality of smart battery modules configured to be removably connected in parallel to the DC bus. Each battery module comprises a decoupling unit configured to electrically disconnect, or connect the battery module to, or from, the DC bus. The monitoring and control system is configured to monitor supply of mains power to the mains converter, the voltage of the DC bus, the terminal voltage of each smart battery module, and the magnitude of the load is that is present on the DC bus. The monitoring and control system is configured to control the DC output voltage of the mains converter; and control the decoupling unit of each smart battery module to be in one of at least: a connected mode, and a disconnected mode.

18 Claims, 12 Drawing Sheets

MODULAR POWER SYSTEMS

CROSS-REFERENCE TO RELATED APPLICATIONS

This United States Patent Application claims priority to New Zealand Patent Application No. 736016 filed 2 Oct. 2017 which is incorporated herein by reference.

STATEMENT REGARDING FEDERALLY SPONSORED RESEARCH

Not applicable

NAMES OF THE PARTIES TO A JOINT RESEARCH AGREEMENT

Not applicable

REFERENCE TO A SEQUENCE LISTING

Not applicable

TECHNICAL FIELD

The present disclosure relates to a modular power system, and more particularly to a modular power system for providing DC backup power.

BACKGROUND

Protection against data corruption and preservation of critical services, such as phone and data connections, are a necessity of modern communications, data storage and data processing centers. Data centers, server farms, data storage farms, telecommunications exchanges, and the like, are typically supplied with power from a mains supply network. Protection against a loss of power supply from the mains supply network is typically provided by localized backup power. Backup power can be provided by one, or a combination, of batteries, generators, magnetic energy storage, inertial storage, capacitors, or the like. However, in most modern systems, short to medium term backup power is provided by a battery backup system.

When a mains power failure occurs, a battery backup system is expected to seamlessly activate and maintain power to critical equipment. Ideally a backup power system should provide backup power for the duration of any mains power failure. However, backup power systems are typically sized to provide a specified hold-up time at a specified load due to practical considerations such as cost. As the load, or hold-up time, requirements increase so does the size and cost of the battery backup system. Thus, when designing a battery backup system, a compromise is usually made between the hold-up time and the cost of the system. In many situations, any loss of mains power is quickly restored by the mains supply provider, requiring far less hold-up time than any theoretical worst case that the system must meet.

Typical battery backup systems are provided as integrated units, with a fixed external battery resource. As more load is added to the system, or a longer hold-up time is required, additional battery backup units may be required, but are typically unable to be added due to physical space restraints. Furthermore, expansion with external discrete battery modules can be difficult and time-consuming and may also require the de-powering of the equipment during the upgrade.

A recent solution to this problem is to use modular battery backup systems. These systems include switch mode converters, control circuitry and battery modules that can be combined to provide a configurable system that often only require additional battery capacity to be added to upgrade the system hold-up time/capacity without requiring any other expensive circuit components. One problem that has become apparent with modular type battery backup systems occurs when a new battery that has a terminal voltage significantly different from the DC bus voltage is connected to the DC bus. If the new battery connects directly to the bus a substantial current will flow between the batteries already connected to the DC bus and the new battery. This problem is exacerbated with the use of Lithium based batteries where it is important to avoid large surge currents. If the currents are high enough the new battery, or the existing batteries that are in the system, may be damaged, disconnected or destroyed.

Known systems do not allow for batteries to swapped into, or out from, a hot system, i.e. one that is powered and online. Instead these systems are configured to initialize with a static battery bank installed. If capacity is to be increased, the systems must be de-powered, batteries added, or removed, and then the system powered back on. Another issue is that if additional capacity becomes essential during a loss of mains power, it is not possible to hot-swap discharged batteries in these systems with charged batteries.

SUMMARY OF THE DISCLOSURE

According to an exemplary embodiment of the present disclosure there is provided a modular power system. The modular power system comprises at least one mains converter connected between a mains supply and a DC bus. The modular power system comprises a monitoring and control system connected to the DC bus. The modular power system comprises a plurality of smart battery modules connected in parallel to the DC bus. Each battery module comprises a decoupling unit configured to electrically disconnect, or connect the battery module to, or from, the DC bus. The monitoring and control system is configured to monitor supply of mains power to the mains converter. The monitoring and control system is configured to monitor the voltage of the DC bus. The monitoring and control system is configured to monitor the terminal voltage of each smart battery module. The monitoring and control system is configured to monitor the magnitude of the load is that is present on the DC bus. The monitoring and control system is configured to control the DC output voltage of the mains converter. The monitoring and control system is configured to control the decoupling unit of each smart battery module to be in one of at least: a connected mode, and a disconnected mode.

In exemplary embodiments, each component may comprise a hot pluggable interface configured for connection with a corresponding interface of the modular power system. Reference to hot plugging should be understood to mean the ability to connect a component to the system while it is powered—i.e. without shutting down or otherwise depowering the system. Reference may also be made to hot swapping of components, which should generally be understood to mean the ability to connect or disconnect the component without interruption to the system. For completeness, it should be appreciated that a hot pluggable component may also be hot swappable, and use of either term herein is not intended to be limiting to one or the other unless expressly stated otherwise. In exemplary embodiments, each of the mains converter(s), components of the monitoring and control system, and smart battery modules may comprise a different hot pluggable interface configuration. By using different hot pluggable interfaces, the respective components may be restricted from being plugged into an incorrect interface within the modular power system. It will, however, be appreciated that in exemplary embodiments a universal hot pluggable interface may also be used, such an interface being configured to receive each type of hot pluggable component.

The one or more mains converter(s) may take a number of forms, examples of which comprise, but should not be limited to: AC/DC rectifiers that convert an AC mains supply to a regulated DC bus voltage, or DC/DC converters that convert a mains supplied DC bus voltage, or an unregulated mains DC supply to a regulated DC bus voltage. It should also be understood that in exemplary embodiments comprising more than one mains converter, the mains converters may be configured to operate in parallel, for example to provide redundancy in case of failure of a single mains converter. In such systems, the mains converters may be configured to share the load by distributing the power demand between them.

Exemplary embodiments of the present disclosure may use hot-swappable AC/DC rectifiers as the one or more mains converter(s). It is envisaged that when a rectifier is disconnected from the system, the remaining rectifiers may redistribute the load between them. Further, when a rectifier is hot-swapped into the system, the load is shared with that rectifier.

In exemplary embodiments the functions of the monitoring and control system may be distributed between two or more of: the smart battery modules, the at least one main converter, and a control and monitoring module. Distribution of the monitoring and control functions is envisaged as having the potential to provide more rapid responses within the system. Distribution of the monitoring and control functions may also allow for greater expandability of the system. In particular, as additional smart battery modules and converters are added, it is envisaged that the additional processing burden may be primarily performed within the newly added smart battery module or mains converter. As a consequence, each battery module may be configured to decide autonomously whether it should be connected to the system bus or not.

In exemplary embodiments the modular power system may comprise two or more control and monitoring modules. Through inclusion of two or more control and monitoring modules, it is envisaged that a greater resilience may be built into the modular power system—for example, if one control and monitoring module fails, its duties may be taken over by a control and monitoring module that is still active.

In exemplary embodiments the modular power system may comprise a mounting system into which modules may be plugged into and out from, for example one or more of: one or more mains converters, smart battery modules, and one or more control and monitoring modules.

In exemplary embodiments each mains converter may comprise a mains detection circuit, and be configured to output an AC present signal when AC mains is being supplied to an input of the mains converter.

In exemplary embodiments the control and monitoring module may be configured to determine the voltage present on the DC bus. It is envisaged that this may be performed by voltage sensing circuitry integrated into the control and monitoring module. In exemplary embodiments, the mains converter may sense the voltage on the DC bus. In such an embodiment, the mains converter may be configured to communicates the measured DC bus voltage to the control and monitoring module.

In exemplary embodiments the control and monitoring module may be configured to schedule one or more battery events such as, but not limited to: periodic battery testing cycles, battery charging cycles, or the like.

In exemplary embodiments the control and monitoring module may be configured to set reference values within a memory of a smart battery module. Such reference values may comprise one or more of, for example: nominal charging current, trickle charging current, maximum charging current, nominal terminal voltage, low voltage disconnect voltage, self-discharge threshold and connection threshold. Such reference values may comprise threshold values utilized by the system.

In an exemplary embodiment, the smart battery modules may be configured to selectively operate in a charging mode. It is envisaged that when the smart battery modules are in a charging mode the DC bus voltage may be adjusted by the control and monitoring module to provide a charging current that does not exceed the maximum charging current of the smart battery modules. If multiple smart battery modules are being charged simultaneously the DC bus may be adjusted so that no smart battery module is charged at more than its rated charging current.

In exemplary embodiments the modular power system may comprise a communications system that allows for the transfer of information and instructions between each of the at least one control and monitoring module, the at least one mains converter and the smart battery modules. The communications system may allow the monitoring and control functions to be distributed across the modular power system. For example, it is envisaged that the at least one mains converter may be configured to communicate information such as, but not being limited to, one or more of: the presence of AC power, the current being supplied, the temperature of key components, and the number of mains converters present. The smart battery modules may communicate information such as, but not limited to, one or more of: the number of smart battery modules present, the current state of charge, an indication of health (such as capacity), the terminal voltage, cell temperatures, the current being supplied, the current being received, the connection state (for example, disconnected, connected or harmonization), and faults that have occurred (over current, low voltage shutdown, over temperature).

In exemplary embodiments the communications system may also be used to provide one or more control signals. The monitoring and control system may communicate signals to the one or more mains converters such as, but not being limited to, one or more of: DC voltage set point levels for the DC bus, and disable/enable signals. Disabling the one or more mains converters may allow redundancy testing of the mains converters and testing of the smart battery modules ability to provide backup power. The smart batteries may be configured to receive communications signals such as, but not being limited to, one or more of: commands to a decoupling unit to connect, or disconnect from the DC bus, or to communicate threshold values, such as, the amount of self-discharge allowable during a float mode before the battery reconnects to the bus to recharge, terminal voltage set points, low voltage disconnect thresholds, maximum charge current, maximum discharge current, or the like. It should be appreciated that numerous protocols for the communications system may be used, examples of which may comprise: $I^2C$, CAN, SBI, RS-232, RS485 or the like.

According to another aspect of the present disclosure there is provided a monitoring and control system for a modular power system, the monitoring and control system comprising a hot pluggable interface configured for connection with a corresponding interface of the modular power system. The monitoring and control system is configured to monitor the voltage of a DC bus of the modular power system. The monitoring and control system is configured to determine whether any mains converters are installed in the modular power system and whether mains power is being supplied to those converters. The monitoring and control system is configured to determine the presence, and individual terminal voltage of each of a plurality of smart battery modules connected to the modular power system. The monitoring and control system is configured to provide a DC level control signal to the one or more mains converters installed in the modular power system. The monitoring and control system is configured to provide a control signal to the smart battery modules present instructing each of the smart battery modules to either connect to the DC bus or disconnect from the DC bus. The monitoring and control system is configured to measure the current load on the DC bus.

Exemplary embodiments of the monitoring and control system may use the determined values of DC bus voltage, current (if any) being supplied to the smart battery modules, and the terminal voltage of the smart battery modules to determine adjustment of the DC bus voltage set point to control the charging current supplied to the smart battery modules.

In exemplary embodiments the monitoring and control system may provide a control signal to the one or more mains converters installed in the modular power system to adjust the DC bus voltage.

Exemplary embodiments of the monitoring and control system may control the DC bus voltage to provide a charge current appropriate to the battery chemistry of the smart battery modules. For example, where the smart battery modules comprise lithium ion batteries, the charge current may be in the range of 0.5 to 0.6 C, where C is the 1 hour charge current rating of the smart battery module. It will be appreciated that the charge current being provided is determined primarily by the battery type and may vary without limitation for different battery chemistries and different battery modules.

In exemplary embodiments the monitoring and control system may raise the DC bus voltage set point to a threshold value that provides a desired terminal voltage to the smart battery modules. Once the threshold value is reached the monitoring and control system may prevent further increase of the DC bus voltage. The desired terminal voltage may be selected to provide a float charge level, or may be chosen to provide a specific hold-up time for the system that is greater than the time required for the smart battery modules to connect to the DC bus and supply power.

In exemplary embodiments the monitoring and control system may be configured to connect to, and be powered from, the DC bus. It is envisaged that this may allow the components associated with the monitoring and control system (for example, circuitry and one or more controllers) to directly monitor the voltage of the DC bus.

According to another aspect of the present disclosure there is provided a smart battery for a modular power system. The smart battery comprises a hot pluggable interface for connecting to a corresponding interface of the modular power system. The smart battery comprises a plurality of battery cells. The smart battery comprises a decoupling unit configured to electrically connect or disconnect the battery cells from the hot pluggable interface. The smart battery comprises a battery module monitoring and control system. The battery module monitoring and control system is configured to determine the terminal voltage of the plurality of battery cells. The battery module monitoring and control system is configured to detect the presence of other smart battery modules connected to the modular power system. The battery module monitoring and control system is configured to detect the presence, and magnitude, of DC power on a bus of the modular power system. The battery module monitoring and control system is configured to control the decoupling unit to either disconnect, or connect, the battery cells in order to allow the supply of power to, or receiving of power from, the DC bus through the hot pluggable interface.

It should be appreciated that various types of battery cells may be used in exemplary embodiments of the present disclosure, examples of which may comprise but should not be limited to: lithium-ion, NiCd, NiMH, lead acid, lithium-ion polymer or the like.

In exemplary embodiments the decoupling unit may be configured to connect and disconnect the smart battery module to and from the DC bus, either allowing current flow from the DC bus into, or out from, the smart battery module or preventing any current from flowing. In practice this may simply involve disconnection of the DC output of the smart battery from the DC bus, whilst leaving other control, detection and communications contacts connected.

In exemplary embodiments the default mode of the decoupling unit may be to disconnect the smart battery module from the DC bus. It is envisaged that this may render power terminals of the smart battery module dead unless it is charging, or it is supplying DC power. When a smart battery module is not installed in a modular power system its DC terminals present no voltage and will supply no current.

In exemplary embodiments each smart battery module may be configured to detect the voltage present on the DC bus. In exemplary embodiments each smart battery module may be configured to detect its effective terminal voltage when disconnected from a DC bus. In exemplary embodiments each smart battery module may provide a signal indicating its presence in the modular power system.

In exemplary embodiments the smart battery modules may be configured to enter into a float mode when the smart battery modules have been charged and their terminal voltages are within a specified voltage range of one another. When in float mode the smart battery modules may be disconnected from the DC bus and typically the only decrease in capacity may be from self-discharge and natural battery degradation over time. The specified voltage range is, or may be, chosen such that inter-battery, and battery-system currents that flow during re-connection of the smart battery modules to the DC bus, are not sufficiently high to cause damage to the batteries, or to any other system componentry to which they are connected. It is envisaged that when a smart battery module has a terminal voltage that is within the specified voltage range they may be deemed to be harmonized by the modular power system. In an exemplary embodiment, each smart battery module may be controllable to operate in a harmonization mode. In exemplary embodiments, each smart battery module maybe configured to operate in a harmonization mode when connected to a DC bus. It is envisaged that when in harmonization mode a smart battery module may determine whether its terminal voltage has deviated from the terminal voltage of other harmonized smart battery modules in the system by greater than a predetermined voltage range. It is envisaged that in harmonization mode the DC bus is not used to regulate the charging current, instead the smart battery module itself controls the charge current until the harmonization voltage is reached (i.e. the deviation is within the predetermined range).

In exemplary embodiments the circuitry used to provide harmonization charging currents may be integrated into each smart battery module. The harmonization charge current circuitry may take a number of forms, examples of which comprise circuits capable of providing a variable current supply, such as, but not being limited to, one or more of: DC-DC converters, transistor current sources, resistive current limiting, or the like.

In exemplary embodiments, when in float mode, each smart battery module may be configured to monitor the DC bus voltage, and if the bus voltage drops below the battery float voltage by a predefined threshold, the decoupling unit may connect the smart battery module to the DC bus and the smart battery module supplies current to the DC bus.

In exemplary embodiments the decoupling unit may comprise one or more electronic switches, such as transistors, relays or the like. In exemplary embodiments the decoupling unit may comprise at least one bi-directional MOSFET switch. In an exemplary embodiment, the decoupling unit may comprise a Buck-boost circuit—for example, a Buck-Boost switching regulator controller such as the LM5118 Wide Voltage Range Buck-Boost Controller supplied by Texas Instruments Incorporated (Dallas, TX, US).

In exemplary embodiments the decoupling unit may be configured to provide at least three states of connection to the DC bus: a disconnected mode where no current flows to or from the smart battery module, a connected mode where current is able to flow substantially unimpeded to and from the smart battery module, and a harmonization mode where a limited current is able to flow. It is envisaged that the harmonization mode may be configured to adjust the level of charge current supplied to the smart battery module depending on a differential between the battery terminal voltage and the DC bus voltage. For example, if the voltage differential is relatively high, a relatively low level trickle charge may be provided. It should be appreciated that the levels of charge may be determined based on charging characteristics of the cells used in a smart battery module.

In exemplary embodiments the battery module monitoring and control system may monitor the current being supplied to, and from, the plurality of battery cells within a smart battery module. In an exemplary embodiment the battery module monitoring and control system may switch the decoupling unit from a connected mode to a harmonization mode if the current flowing into the smart battery module exceeds a predefined charge current threshold. It is envisaged that when the decoupling unit is switched to harmonization mode the charge current is, or may be, reduced—for example, to a trickle charge rate. By way of example, the reduced charge rate may be determined based on temperature rise within the smart battery module. It is envisaged that for lithium ion batteries, this reduced charge rate may be less than 0.2 C, where C is the 1 hour charge current rating of the battery cells. Again, it should be appreciated that the reduced charge current may be dependent on the type of battery cell used.

In exemplary embodiments the smart battery module monitoring and control system may be configured to switch the decoupling unit from a connected mode to a disconnected mode if the current flowing out of the battery cells exceeds a discharge current threshold. It is envisaged that for lithium ion batteries this is, or may be, in the order of 1.5 C to 2.0 C, where C is the 1 hour charge current rating of the battery cells. Again, it should be appreciated that a recommended threshold for the discharge current may be influenced by the type of battery cell used—for some battery types this value could be as high as 5 C or even 10 C.

In exemplary embodiments the battery module monitoring and control system may be configured to switch the decoupling unit from a connected mode to a disconnected mode based on a combination of the magnitude of an over-current and the duration of the over-current. For example, a current above 1 C may result in disconnection after 30 minutes, a current above 2 C may result in disconnection after 10 minutes, a current above 4 C may result in disconnection after 1 minute, a current above 6 C may result in disconnection after 10 seconds, and a current above 10 C may result in disconnection after 1 second. It will be appreciated that the disconnection thresholds and times are provided by way of example, and should not be seen as being limiting. It is envisaged that accommodating variation in the levels of over-current and disconnection times may provide the system with greater resilience against transient loads. In exemplary embodiments of the modular power system of the present disclosure, transient load resilience may be beneficial to prevent over-current shutdown due to momentary current fluctuations as smart battery modules are swapped into and out of the system.

In exemplary embodiments both the monitoring and control system and the individual smart battery modules may be capable of controlling the decoupling unit to connect or disconnect the smart battery module to and from the DC bus. According to a further aspect of the present disclosure there is provided a smart mains converter for a modular power system. The smart mains converter comprises a hot pluggable interface for connecting to a corresponding interface of the modular power system. The smart mains converter comprises an adjustable DC output. The smart mains converter comprises a controller configured to adjust the DC output level based on a signal provided by a monitoring and control system connected to the modular power system.

According to a further aspect of the present disclosure there is provided a method of hot swapping a smart battery module into a modular power system that is providing backup power. The method comprises connecting a hot pluggable interface of the smart battery module with a corresponding interface of the modular power system. The method comprises detecting the presence, and magnitude, of DC voltage on a DC bus of the modular power system. The method comprises detecting the terminal voltage of the smart battery module. The method comprises detecting the presence of other smart battery modules that are also connected to the modular power system. The method comprises detecting whether mains power is being supplied to the modular power system. The method comprises determining the magnitude of the loading on the DC bus. The method comprises setting the state of a decoupling unit of the smart battery modules to one of at least: a connected mode, and a disconnected mode, wherein setting of the state of the decoupling unit is based on the detected presence, and magnitude of, DC voltage on the DC bus, the terminal voltage of the battery, the presence of other smart battery modules and the magnitude of the loading on the DC bus.

In an exemplary embodiment, the setting of the state of the decoupling unit of the smart battery modules comprises setting the state to one of at least: a connected mode, a disconnected mode, and a harmonization mode.

According to a further aspect of the present disclosure there a method of harmonizing a bank of smart battery modules connected to a modular power system, the modular power system comprising: at least one mains converter connected between a mains supply and a DC bus, a monitoring and control system connected to the DC bus, and a plurality of smart battery modules connected in parallel to the DC bus. The method comprises each smart battery module determining the terminal voltage of that smart battery module. The method comprises each smart battery module determining the DC bus voltage. The method comprises each smart battery module determining compares the difference between the determined terminal voltage and the DC bus voltage. The method comprises each smart battery module determining setting its connection mode to one of a connected mode, or disconnected mode based on the difference between the determined terminal voltage and the DC bus voltage.

In an exemplary embodiment, the setting of the connection mode comprises setting the mode to one of at least: a connected mode, a disconnected mode, and a harmonization mode.

In exemplary embodiments the individual batteries may determine their connection state or mode. However, this should not be seen as being a limitation to every embodiment of the present disclosure, as it is envisaged that the connection state or mode may be set by a centralized controller monitoring all of the battery modules, i.e. a centralized rather than distributed control strategy.

It is envisaged that the determination of voltage levels, such as the DC bus level, will typically be provided by a combination of analog and digital electronics, for example a voltage divider may be used to provide an input to an analog to digital converter of a controller such as a microprocessor.

In exemplary embodiments a centralized controller may be configured to receive communications from the smart battery modules and may be configured to provide communications to the smart battery modules to instruct each smart battery module to enter into connected mode, disconnected mode or harmonization mode.

According to another exemplary embodiment of the present disclosure there is provided a method of connecting a smart battery module to a modular power system. The method comprises connecting a hot pluggable interface of the smart battery module with a corresponding interface of the modular power system. The method comprises detecting the presence, and magnitude, of DC voltage on a DC bus of the modular power system. The method comprises detecting the terminal voltage of the smart battery module. The method comprises detecting the presence of other smart battery modules that are also connected to the modular power system. The method comprises detecting whether mains power is present. The method comprises setting the state of a decoupling unit of the smart battery module to one of: a connected mode, or a disconnected mode, wherein setting of the state of the decoupling unit is based on the detected presence, and magnitude of, DC voltage on the DC bus, the terminal voltage of the battery, the presence of other smart battery modules and whether mains power is present.

In exemplary embodiments the decoupling unit may be configured to provide an additional harmonization mode, such that the decoupling unit of the smart battery modules may be set to one of: a connected mode, a disconnected mode, and a harmonization mode.

According to another aspect of the present disclosure there is provided a method of providing back up power by way of a modular power system, the modular power system comprising: at least one mains converter connected between a mains supply and a DC bus, a monitoring and control system connected to the DC bus, and a plurality of smart battery modules connected in parallel to the DC bus, the method comprising: detecting the loss of mains power supply to the mains converter, and switching the state of decoupling units within each of the plurality of smart batteries to a connected mode, wherein the at least one mains converter provides a full load hold up time that is less than the time taken to switch the decoupling units of the plurality of smart batteries to the connected mode.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
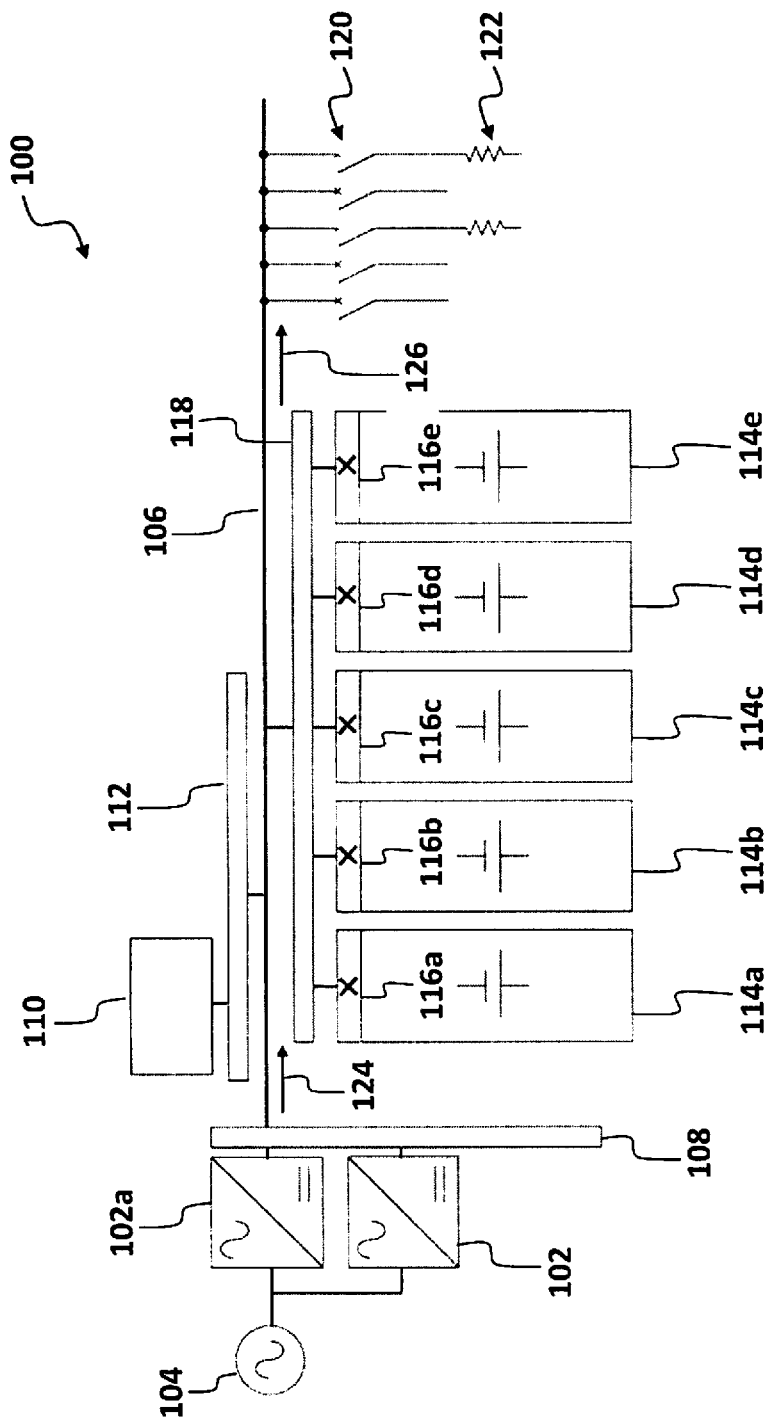
FIG. 1 is a functional block diagram of a modular power system according to an exemplary embodiment of the present disclosure.

FIG. 1 shows a modular power system 100 according to an exemplary embodiment of the present disclosure. The modular power system 100 comprises two mains converters 102a, 102b. In this exemplary embodiment the mains converters 102a, 102b are AC/DC rectifiers that are connected between an AC mains supply 104 and a DC bus 106. Each of the mains converters 102a, 102b plugs into hot pluggable interface 108. A monitoring and control system, provided as a control and monitoring module 110 in this exemplary embodiment, is connected by way of hot pluggable interface 112 to the DC bus 106. It will be apparent that although only a single control and monitoring module 110 is shown, a second control and monitoring module could also be installed.

Figure 12:
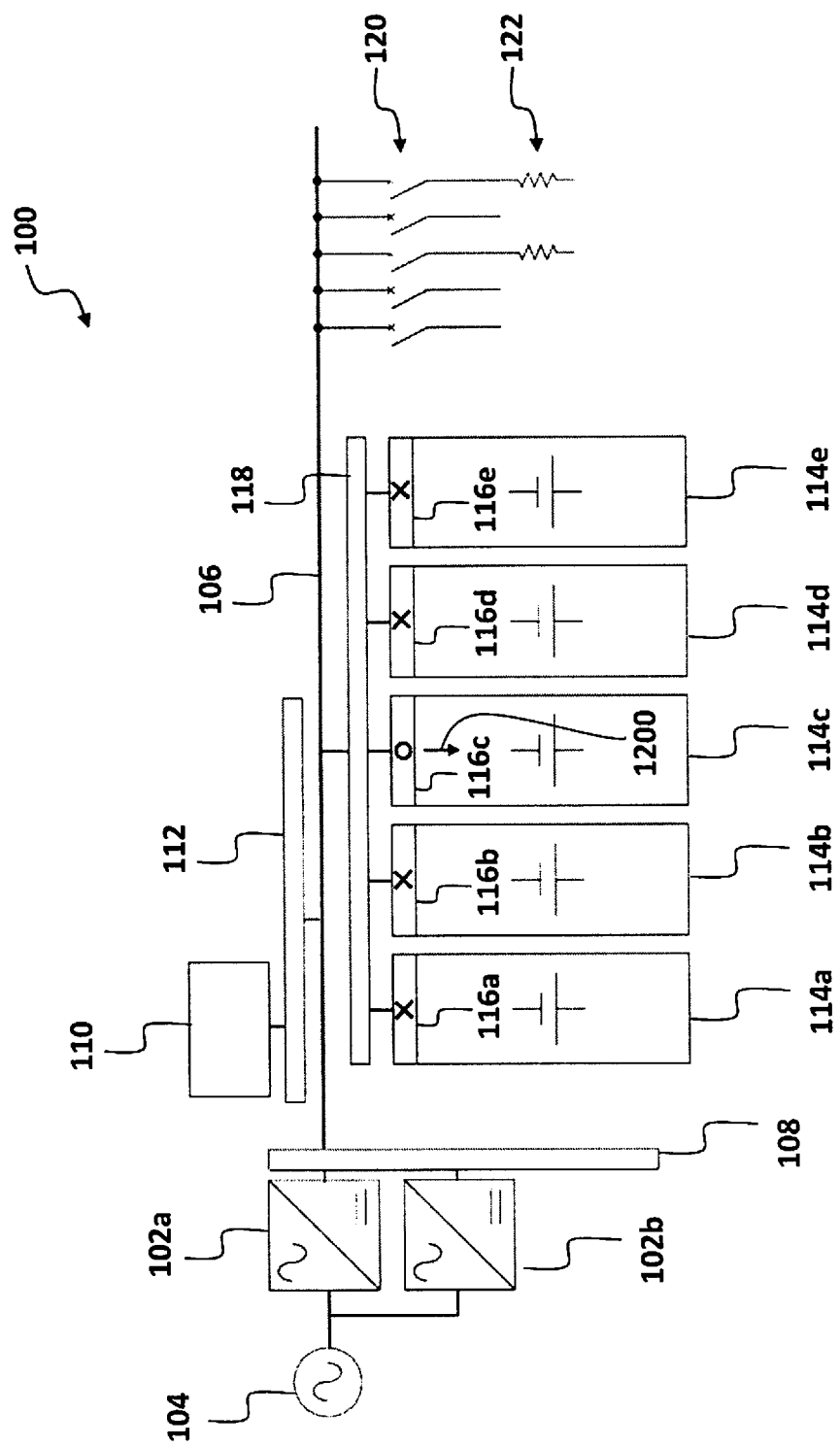
FIG. 12 is another block diagram showing the modular power system in a charging mode.

In the exemplary embodiment illustrated, smart battery modules 114 (for example, smart battery modules 114a, 114b, 114c, 114d and 114e) are connected in parallel to the DC bus 106. Each smart battery module 114 comprises a decoupling unit 116 (for example, decoupling units 116a, 116b, 116c, 116d and 116e) that is configured to electrically disconnect, or connect the respective smart battery modules 114 from the DC bus 106 by way of a hot pluggable interface 118. In the figures the decoupling units 116 are illustrated with a symbol that indicates the mode each decoupling unit 116 is operating in. See for example FIG. 10, in which the decoupling units 116a, 116b, 116d and 116e of smart battery modules 114a, 114b, 114d and 114e are in a disconnected mode, as indicated by 'X' symbol 1000. In FIG. 12 the decoupling unit 116c of smart battery module 114c is in a connected mode as indicated by the '0' symbol 1200. In FIG. 1, each of the decoupling units 116 of smart battery modules 114 are in a disconnected mode, as indicated by the 'X' symbols. In this mode the batteries are in a floating state; they are not charging from, or discharging into, the DC bus 106. The terminals, not shown, of the smart battery modules 114 that supply DC current to the DC bus are not live.

Also connected to DC bus 106 are load circuit breakers 120 and loads 12. The loads 122 may take a number of forms, examples of which may comprise, but should not be limited to, server racks, telecommunications equipment, data storage equipment, or the like.

The control and monitoring module 110 is configured to monitor whether AC mains power 104 is being supplied to the mains converters 102, what the voltage of the DC bus 106 is, and what the magnitude of the load 122 is that is present on the DC bus 106. The modular power system 100 comprises a communications system, not shown, that is integrated into each of the mains converters 102, control and monitoring module 110, and smart battery modules 114. In exemplary embodiments, the terminal voltage of each smart battery module 114 may be monitored by the control and monitoring module 110—but it is envisaged that the terminal voltage may be monitored by each smart battery module 114 and communicated to the control and monitoring module 110.

The smart battery modules 114 each comprise an internal memory that is programmed with threshold levels for: nominal charging current, trickle charging current, maximum charging current, nominal terminal voltage, low voltage disconnect voltage, self-discharge threshold and connection threshold. It is envisaged that each smart battery module 114 may comprise default values pre-programmed for each of these parameters, however the control and monitoring module 110 may be configured to adjust these values if a firmware update with altered values is received, or if a user manually alters the values to better suit their requirements.

Figure 2:
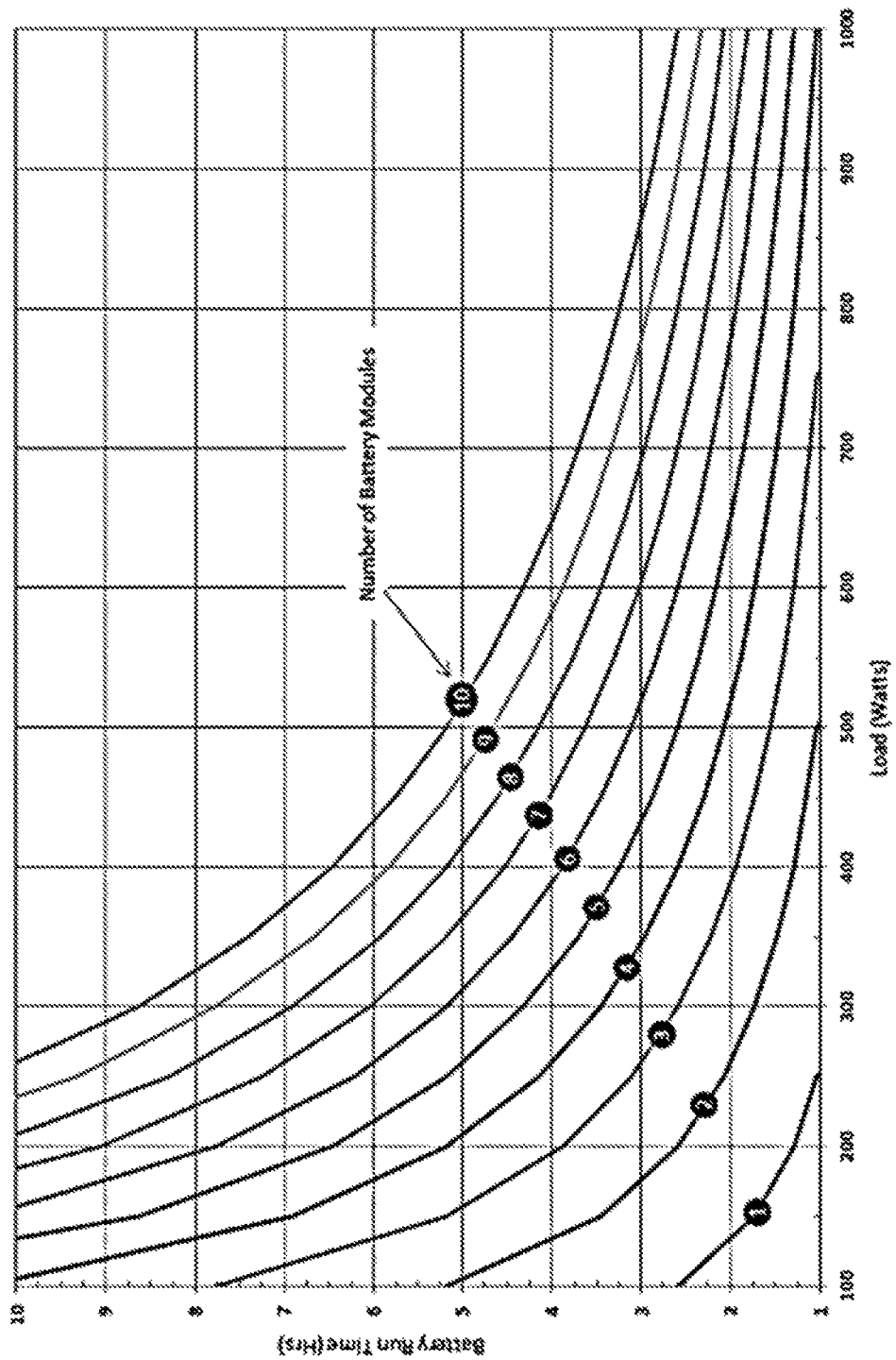
FIG. 2 is a chart showing discharge curves for exemplary modular power systems of the present disclosure having various numbers of smart battery modules installed.

FIG. 2 is a chart showing discharge curves for modular power systems 100 having various numbers of smart battery modules installed. When initially specifying a modular power system 100 a desired hold-up time is specified along with the loading of the equipment that is to be supplied. Referring to the chart of FIG. 2, a discharge curve 200 of the exemplary modular power system 100 shown in FIG. 1 (including five smart battery modules 114) shows that a four hour hold-up time would be provided for a load of around 320 Watts. However, as the load on the modular power supply system 100 increases the hold-up time decreases. For example, if the load on the modular power supply system of FIG. 1 is increased to 650 Watts, a ten battery system would need to be installed in order to provide the same four hour hold-up time (see discharge curve 202). With traditional battery backup systems the batteries are not hot-swappable, and once the four hour hold-up time is reached the backup power supply would fail. However, with a hot swappable modular power system, such as that presently described, a discharged smart battery module can be removed and replaced with a charged smart battery module. Provided charged smart battery modules can be hot-swapped into the battery backup system, the system can be kept operational. It also becomes possible to swap smart battery modules from one modular power system 100 to another. This can be useful where less critical equipment can be shut down and the smart battery modules of that system can be moved to more critical equipment.

Figure 3:
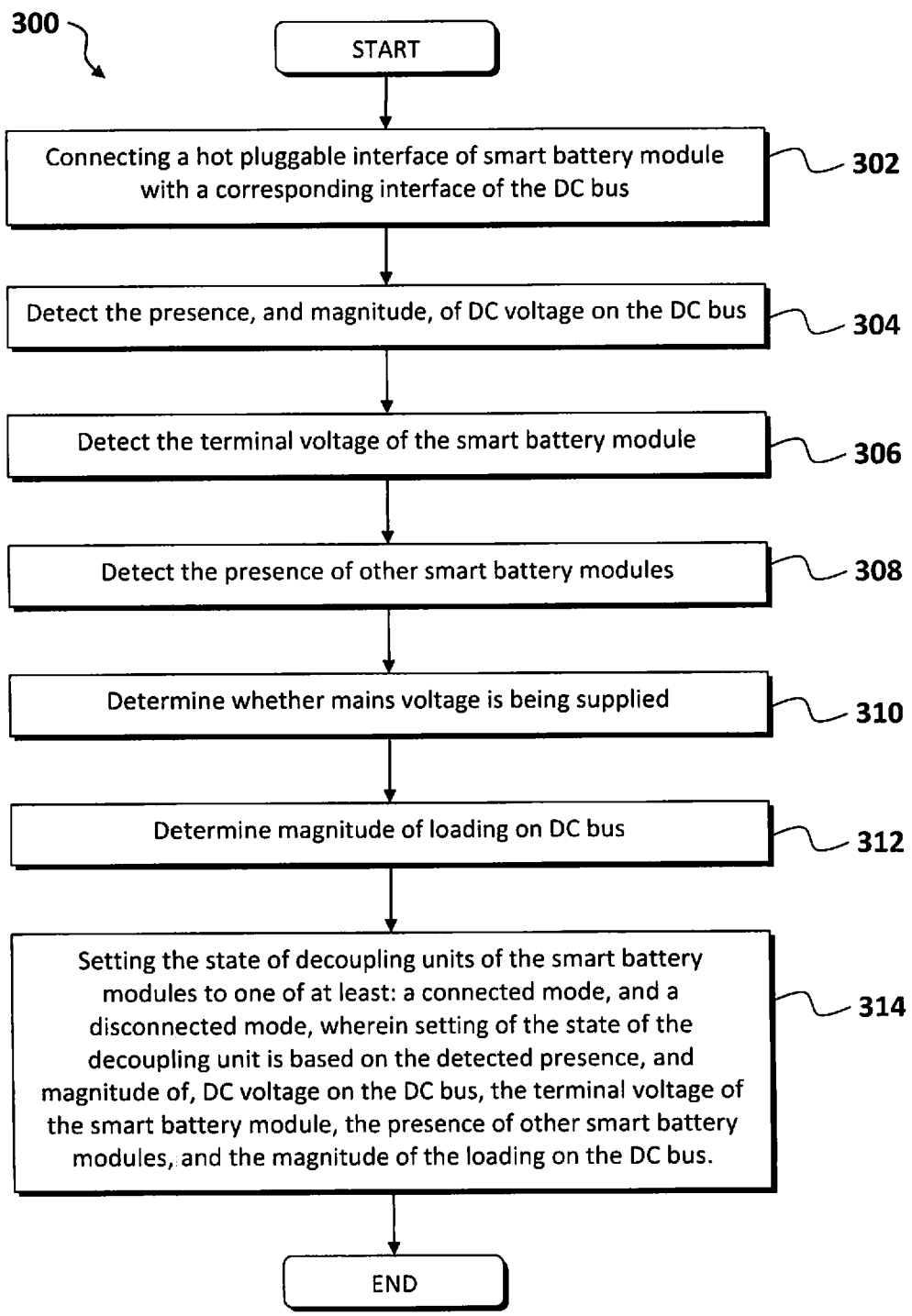
FIG. 3 is a flow chart of an exemplary method of hot swapping a smart battery module into the modular power system.

FIG. 3 is a flow chart illustrating an exemplary method 300 of hot swapping a smart battery module 114 into modular power system 100 that is providing backup power. The method 300 comprises a first step 302 of connecting a hot pluggable interface 118 of the smart battery module 114 with a corresponding interface of the modular power system, more particularly DC bus 106. In step 302 the presence, and magnitude, of DC voltage on the DC bus 106 of the modular power system 100 are detected. In step 304 the terminal voltage of the smart battery module 114 is detected. In step 306 the presence of other smart battery modules 114 that are also connected to the DC bus 106 are detected. In step 308 a determination of whether mains power is being supplied to the modular power system is made. In step 310 the magnitude of the loading on the DC bus 106 is determined. In step 312 the state of decoupling units 116 of the smart battery modules 114 is set to one of at least: a connected mode, and a disconnected mode, wherein setting of the state of the decoupling unit 116 is based on the detected presence, and magnitude of, DC voltage on the DC bus 106, the terminal voltage of the smart battery module 114, the presence of other smart battery modules 114 and the magnitude of the loading on the DC bus 106.

Figure 4:
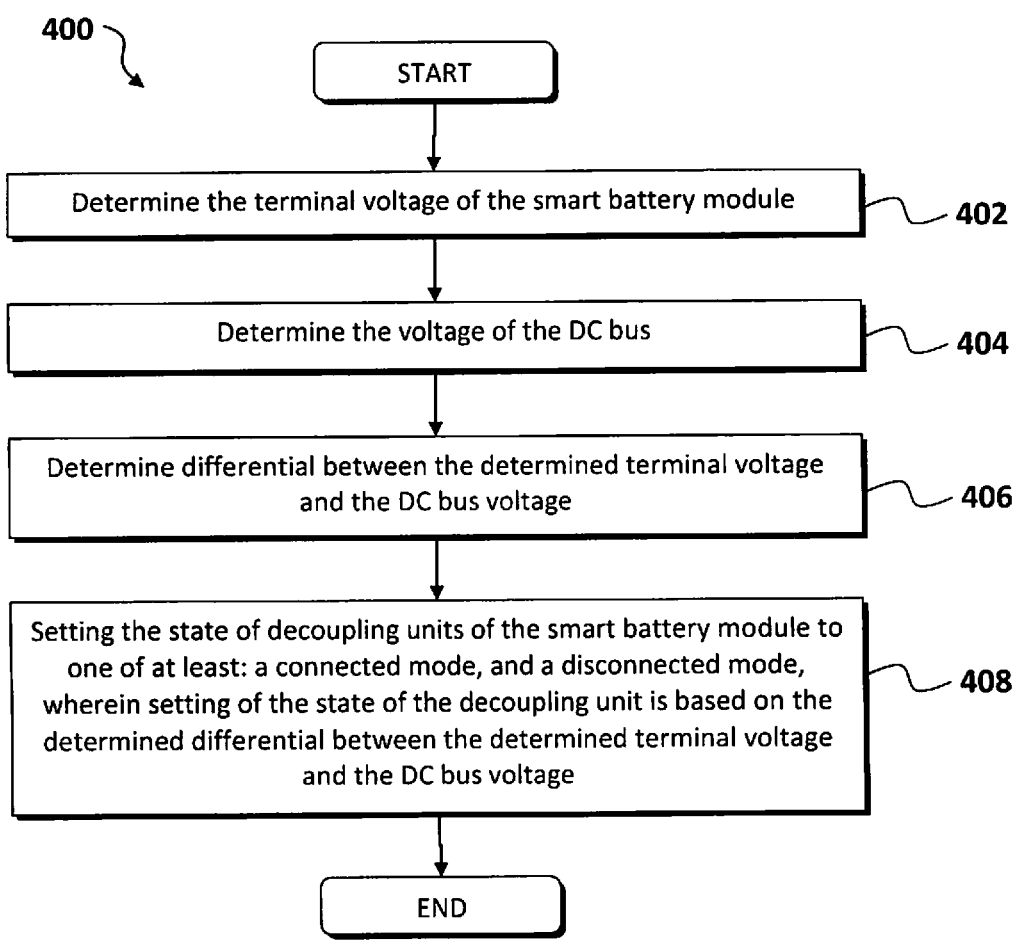
FIG. 4 is a flow chart of an exemplary method of harmonizing a bank of smart battery modules connected to the modular power system.

FIG. 4 is a flow chart illustrating a method 400 of harmonizing a bank of the smart battery modules 114 connected to the modular power system 100. The method 400 comprises a first step 402 in which each smart battery module 114 determines the terminal voltage of that smart battery module 114. In step 404, each smart battery module 114 determines the DC bus voltage. In step 406, each smart battery module 114 compares the difference between the determined terminal voltage and the DC bus voltage. In step 408, each smart battery module 114 sets its connection mode to one of at least a connected mode, or disconnected mode based on the difference between the determined terminal voltage and the DC bus voltage.

Figure 5:
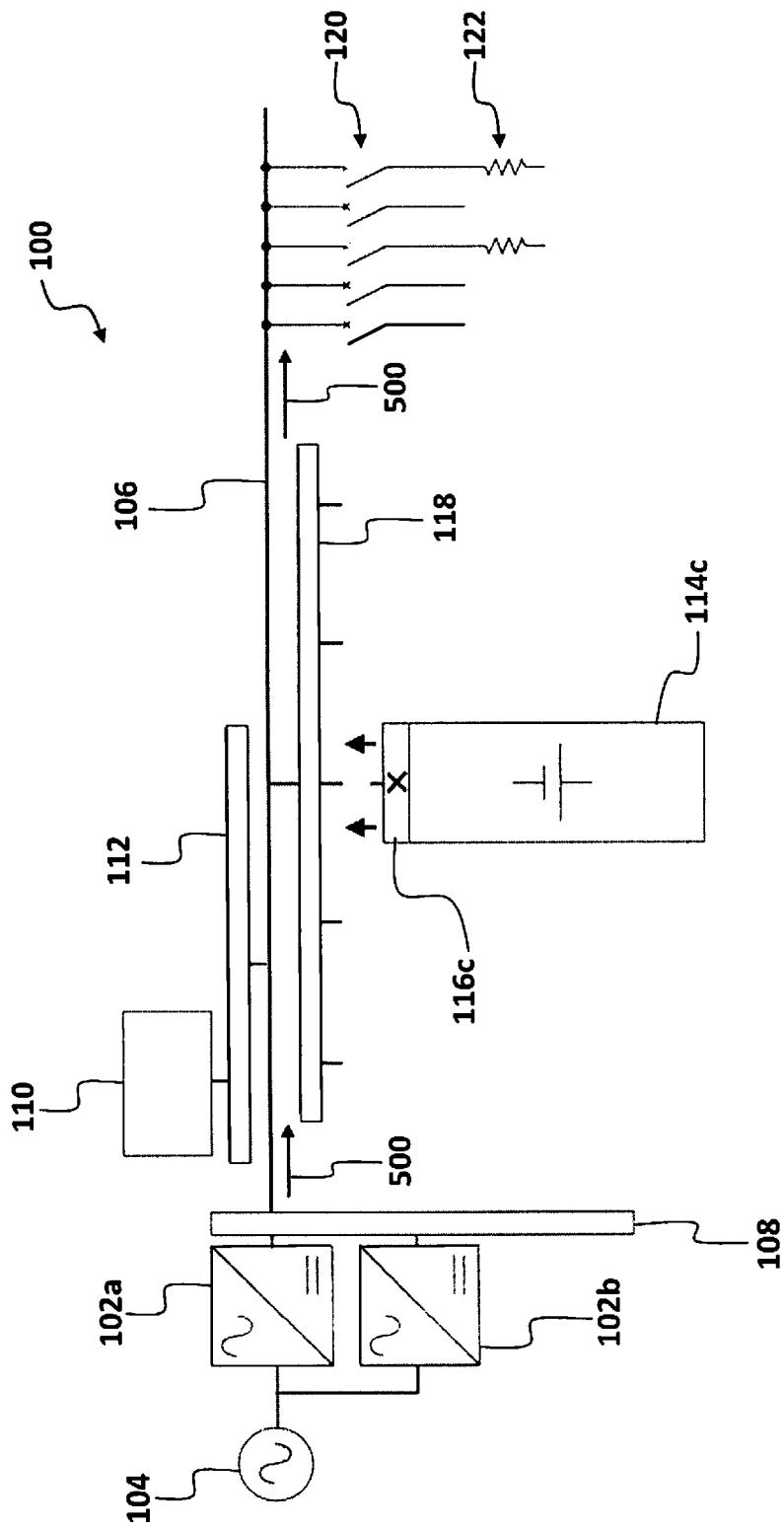
FIG. 5 is a block diagram showing a configuration of the exemplary modular power system with a smart battery module being inserted.

In order to further highlight the advantages and function of the present invention it will now be described by way of a number of examples. FIG. 5 is a block diagram showing the modular power system 100 of FIG. 1 in a condition in which all of the smart battery modules 114 have been removed. AC mains supply 104 is being provided to mains converters 102 which are providing a regulated DC voltage on DC bus 106. DC current 500 is flowing through the DC bus 106 and is powering load 12. A smart battery module 114c is being hot inserted into hot pluggable interface 10. Once the hot pluggable interface 118 between the smart battery module 114c and the modular power system 100 is connected the smart battery module 114c detects the presence and magnitude of the DC voltage on the DC bus 106. The smart battery module 114c also determines its terminal voltage and detects whether there are other smart battery modules 114 connected to the modular power system 100 (of which there are none in FIG. 5). The smart battery module 114c also determines whether AC power is being provided to the mains converters 102, which in FIG. 5 is true. Based on the parameters determined by the smart battery module 114c, the state of decoupling unit 116c is set to one of: a connected mode, a disconnected mode or a harmonization mode.

In the example of FIG. 5, the deciding factor of the state the smart battery module 114c sets the decoupling unit 116c to is based on the level of the DC bus voltage relative to the terminal voltage of the smart battery module 114c. If the terminal voltage of the smart battery module 114c is within a predefined difference threshold from the DC bus voltage the decoupling unit 116c is set to connection mode. The predefined difference threshold is, or may be, set in a memory of the smart battery module 114c and in an exemplary embodiment may be set to be about 1V (although it will be appreciated that the value will be influenced by the system design). In a connection mode, current flows from the DC bus into, and charges, the smart battery module 114c. Conversely, if the terminal voltage of the smart battery module 114c is less than the predefined difference threshold from the DC bus 106 voltage then the decoupling unit 116c may be set to a harmonization mode. In harmonization mode the decoupling unit 116c conducts current, but at a limited rate. The rate may be (but not limited to) in the order of 0.1 to 0.2 C, and is based on keeping the circuit and battery temperature within pre-set temperature limits.

Figure 6:
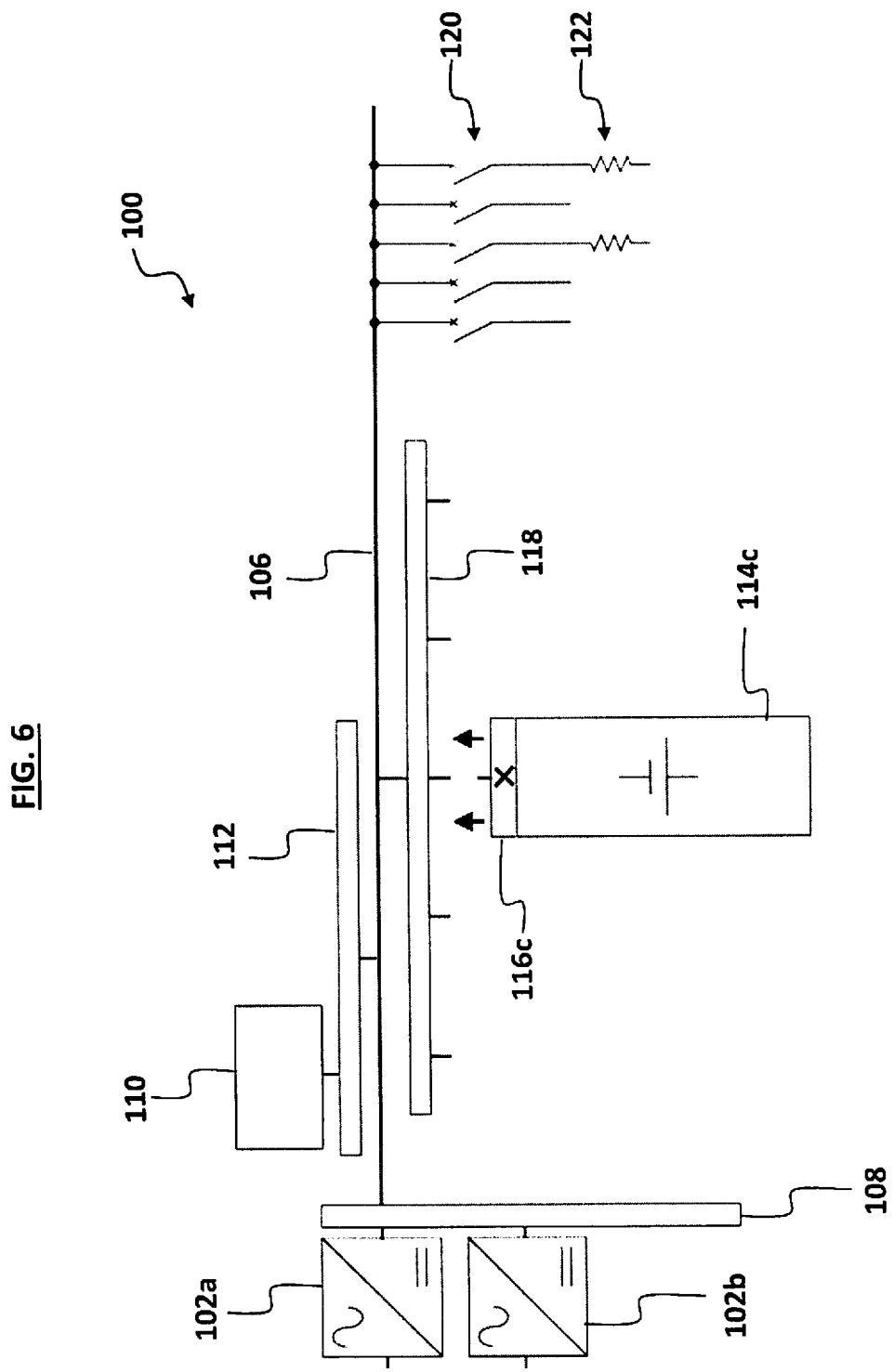
FIG. 6 is a block diagram showing a configuration of the exemplary modular power system with a smart battery module being inserted, in a condition with no AC mains supply present.

FIG. 6 is a block diagram showing the same configuration of modular power system 100 as is shown in FIG. 5. In contrast to FIG. 5, the system shown in FIG. 6 has no AC mains supply being supplied to mains converters 102. The DC bus 106 therefore has no DC voltage present. A smart battery module 114c is being inserted into hot pluggable interface 118. Once the hot pluggable interface 118 between the smart battery module 114c and the modular power system 100 is made the smart battery module 114c detects an absence of power on the DC bus 106. The smart battery module 114c also determines its own terminal voltage and checks whether there are other smart battery modules connected to the modular power system 100 (of which there are none in FIG. 3). The smart battery module 114c also determines whether AC power is being provided to the mains converters 102, which in this example is not the case.

In the example of FIG. 6, provided the terminal voltage of the smart battery module 114c is greater than a low voltage threshold set within a memory of the smart battery module 114c, the decoupling unit 116c may be set to a connected mode. In the connected mode the DC bus is livened up to the terminal voltage of the smart battery module 114c. The control and monitoring module 110 and the load 122 are connected to the DC bus 106 and are powered on. If the current drawn by the load and the control and monitoring module 110 is less than an over-current threshold set in a memory of the smart battery module 114c, the smart battery module 114c will continue to supply power. However, if the current drawn by the load 122 and the control and monitoring module 110 is greater than the over-current threshold set in the memory of the smart battery module 114c, then the decoupling unit 116c will be set to a disconnected mode. If additional smart battery modules are inserted into the system and the smart battery modules have battery terminal voltages that are within a connection threshold to one another (for example about 1V) the smart battery modules will turn on together to supply the load.

Figure 7:
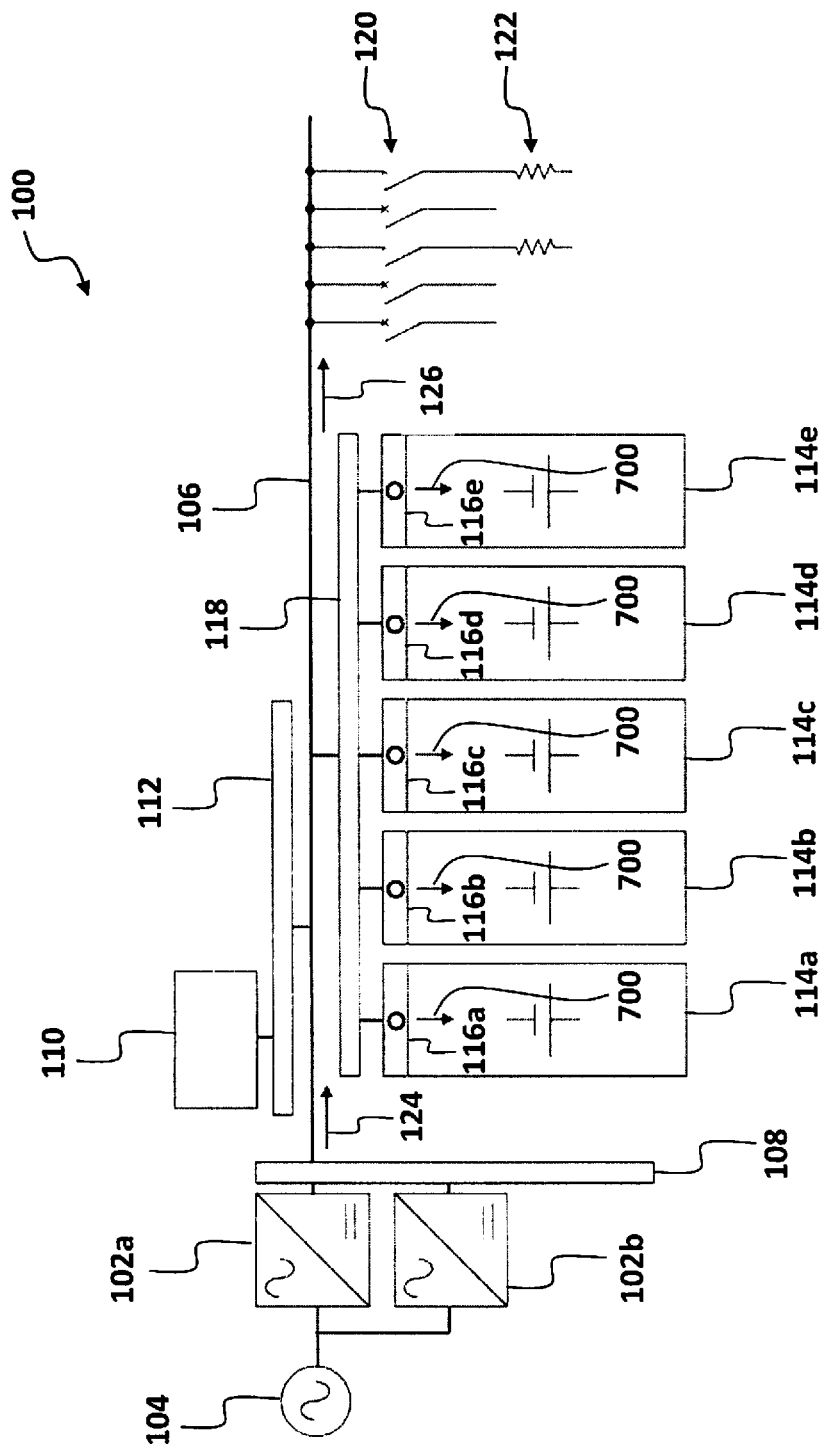
FIG. 7 is a block diagram showing the exemplary modular power system in a charging mode.

FIG. 7 is a block diagram of the same modular power system shown in FIG. 1. In FIG. 7 AC power 104 is supplied to mains converters 102. The mains converters 102 provide a DC voltage on DC bus 106 and current 124 flows onto the DC bus 106. Current 124 comprises load current 126 and charging currents 700 that flow into each of smart battery modules 114, as well as other minor current flows, not shown, such as the current consumed by control and monitoring module 110 which becomes powered on as the DC voltage becomes live.

The configuration of the modular power system 100 depicted in FIG. 7 can be initiated by a number of system scenarios. One such scenario involves the smart batteries modules 114 having been in a float mode for a sufficient period of time that the self-discharge of the smart battery modules 114 results in their terminal voltage dropping below the voltage on the DC bus. Once the terminal voltage of a smart battery module 114 drops to greater than the self-discharge threshold set in a smart battery module's memory they switch their decoupling unit 116 to a connected mode. Once connected to the DC bus 106, current 124 flows from the DC bus 106 into the smart battery modules 114 charging the cells, not shown, within the smart battery modules 114.

The charging mode shown in FIG. 7 may also be initiated by control and monitoring module 110. This may be due to a manual instruction having been received from a user prior to a period of heightened risk of an outage, thereby ensuring the system is at maximum capacity. The charging mode may also be initiated periodically when control and monitoring module 110 initiates a battery test. Battery tests are typically performed on a single battery, and are involve the monitoring and control system 110 instructing the decoupling unit 116a, 116b, 116c, 116d, 116e of a smart battery module 114a, 114b, 114c, 114d, 114e to switch to a connected mode. The monitoring and control system then reduces the DC bus 106 voltage causing current to flow from the connected smart battery module 114a, 114b, 114c, 114d or 114e. During this process the discharge current is controlled and the discharge profile is recorded and stored. Over time the stored discharge profiles of subsequent tests can be compared, change in curve shape may indicate a degradation in capacity, or a fault, in the smart battery module 114a, 114b, 114c, 114d or 114e. At completion of the test the smart battery module that was tested may be charged back to its full charge state. In alternative embodiments each smart battery module may comprise a buck-boost circuit so that the battery can discharge itself into the load without requiring the bus voltage to be adjusted to perform a test.

During the charging process the monitoring and control system 110 monitors the magnitude of the current 700 flowing into the smart battery modules 114 and provides a control signal, not shown, to the mains converters 102. The control signal acts to adjust the DC voltage level of the DC bus 106 so that the current flowing into any one smart battery module 114 does not exceed a maximum charge current value defined for the smart battery modules 114 being charged. It will be appreciated that the smart battery modules 114a, 114b, 114c, 114d, 114e may be charged individually, or as a group as is depicted in FIG. 5. As the smart battery modules 114 terminal voltages reach their fully charged state they switch their decoupling units 116 from connected mode to disconnected mode—this may occur simultaneously, or individually as each smart battery module becomes fully charged. When all of the smart battery modules 114 are fully charged the system may return to the float mode depicted in FIG. 1. In float mode, current 124 supplied to DC bus 106 is mostly consumed as load current 126.

Figure 8:
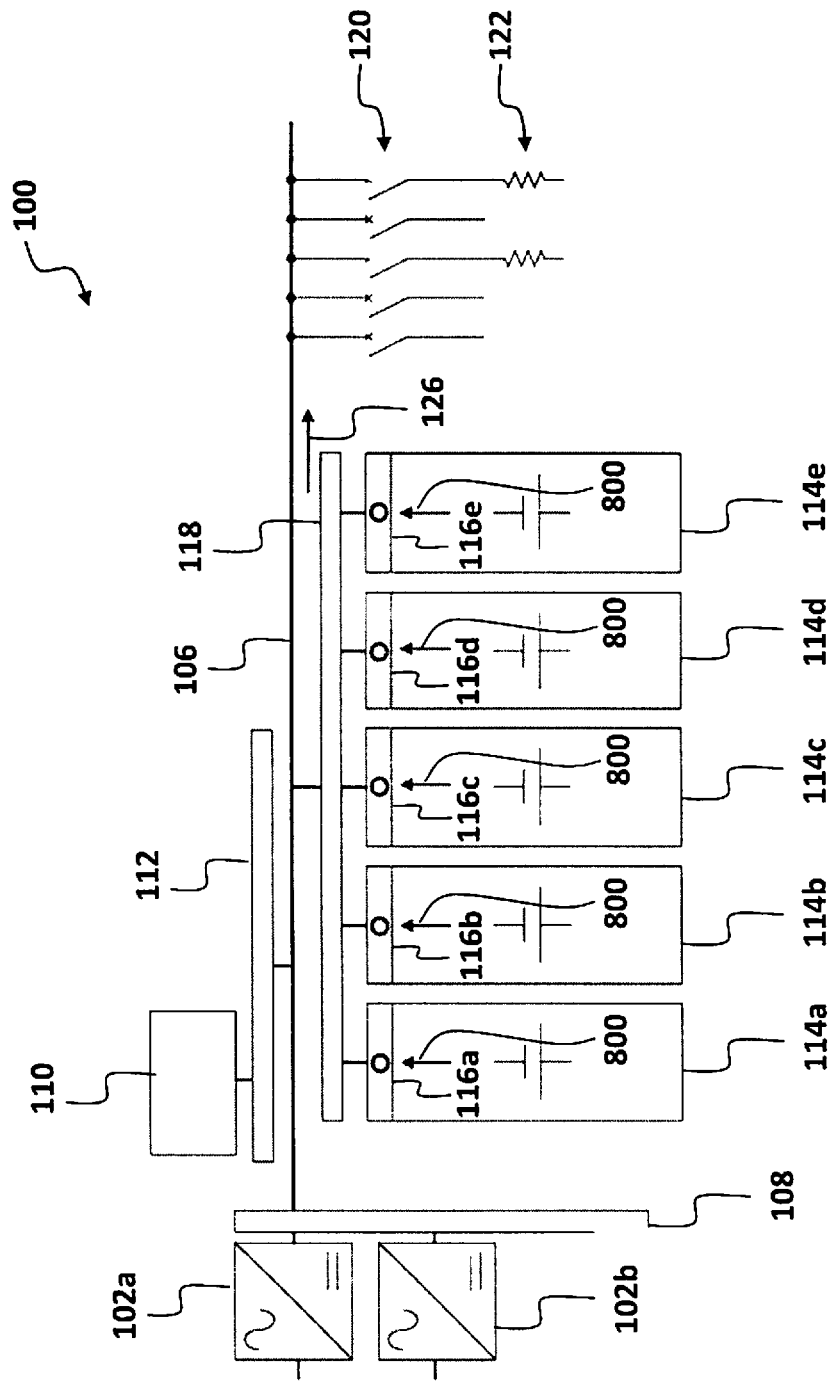
FIG. 8 is a block diagram showing the exemplary modular power system in a discharging mode.

FIG. 8 is a block diagram of the system shown in FIG. 1 in a discharging state. The AC mains supply is not present on the inputs of mains converters 102a, 102b, and each of the mains converters 102a, 102b outputs an indication that AC is not present. It should be appreciated that this may be indicated by one or more of: a signal generated on the absence of AC, or the absence of a normally generated AC present signal. When AC power is first lost the mains converters 102a, 102b provide a short hold-up time—for example, around 10 ms at full load—and results in a controlled fall of the DC bus voltage. As the bus 106 voltage falls below a trigger threshold, the smart battery modules 114 switch their decoupling units 116 from disconnected mode to connected mode. The transition from disconnected mode to connected mode may take, for example, around two ms—resulting in the DC bus voltage stepping up to the terminal voltage of the connected smart battery modules, and load current 126 is supplied as the sum of smart battery module currents 800. The DC bus 106 also powers the control and monitoring module 110.

In exemplary embodiments, each smart battery module 114 may comprise an indicator of the current state of charge—for example one or more lights indicating charge by color or number of lights activated. The control and monitoring module 110 may provide further indication of the state of charge of the smart battery modules 114, or an indication of the total capacity of the modular power system 100. The control and monitoring module 110 may also communicate system status to an operator of the system, for example by email, text message, dedicated software (for example, a smart phone application) or the like.

Figure 9:
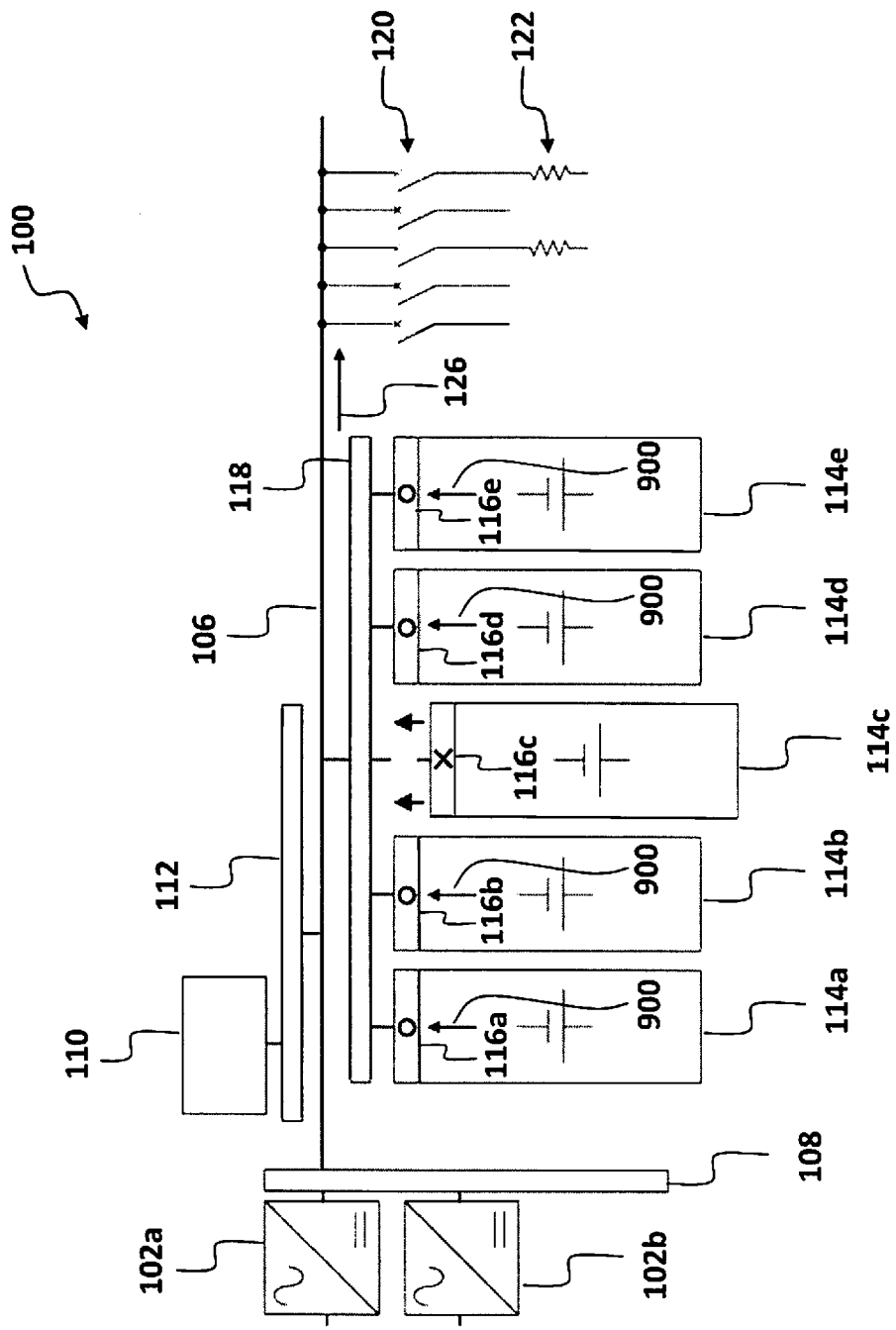
FIG. 9 is a block diagram showing the exemplary modular power system having a smart battery module inserted while DC backup power is supplied.

FIG. 9 is a block diagram of the system shown in FIG. 8, in which a smart battery module 114c is being hot swapped into the system whilst DC backup power is being supplied. As the duration of an AC mains power outage extends towards the maximum hold-up time specification of a particular modular power system installation, such as that shown in FIG. 1, smart battery modules 114 approach their low voltage cut-off threshold. In a traditional battery backup system there is no way to remove and replace batteries when the system is under load, in those systems the batteries will continue to discharge, and if AC mains power is not restored the system will fail and the load will lose power. With the present system, the hold-up time can be extended by swapping out one smart battery module for a more highly charged smart battery module whilst the modular power system 100 is online and providing backup power.

In FIG. 9 a smart battery (not shown) has been unplugged from the hot pluggable interface 10. When the smart battery module is disconnected it switches its decoupling unit to disconnected mode. The smart batteries modules 114a, 114b, 114d and 114e remaining in the modular power system redistribute the load current 126 between them as current 900. A charged smart battery module 114c is plugged into the hot pluggable interface 10, by default its decoupling unit 116c is in disconnected mode. The smart battery module 114c detects the voltage on the DC bus 106 and compares that voltage to its terminal voltage. The smart battery module 114c also detects that AC power is not present. The control and monitoring module 110 provides details of the load current 126 that is being consumed by the load 122. If the load current 126 is less than the current limit threshold programmed in a memory of the smart battery module 114c then smart battery module 114c switches its decoupling unit 116c to connected mode and takes over supply of current 126 to the load. Due to the higher bus 106 voltage provided by smart battery module 114c, smart battery modules 114a, 114b, 114d, 114e switch their decoupling units 116a, 116b, 116d, 116e to disconnected mode and supply no current. As other smart battery modules are swapped into the modular power system 100, they each come online and will share the load current between them if their terminal voltages are less than the connection threshold away from the DC bus 106 voltage. If a smart battery module is inserted that has a terminal voltage that is more than the connection threshold below the DC bus 106 voltage then that smart battery module keeps its decoupling unit in disconnected mode. As smart battery modules that are in connected mode discharge, and the bus 106 voltage drops to within the connection threshold of the terminal voltage of a smart battery module that is in disconnection mode, the disconnection mode decoupling units are switched to connection mode.

Figure 10:
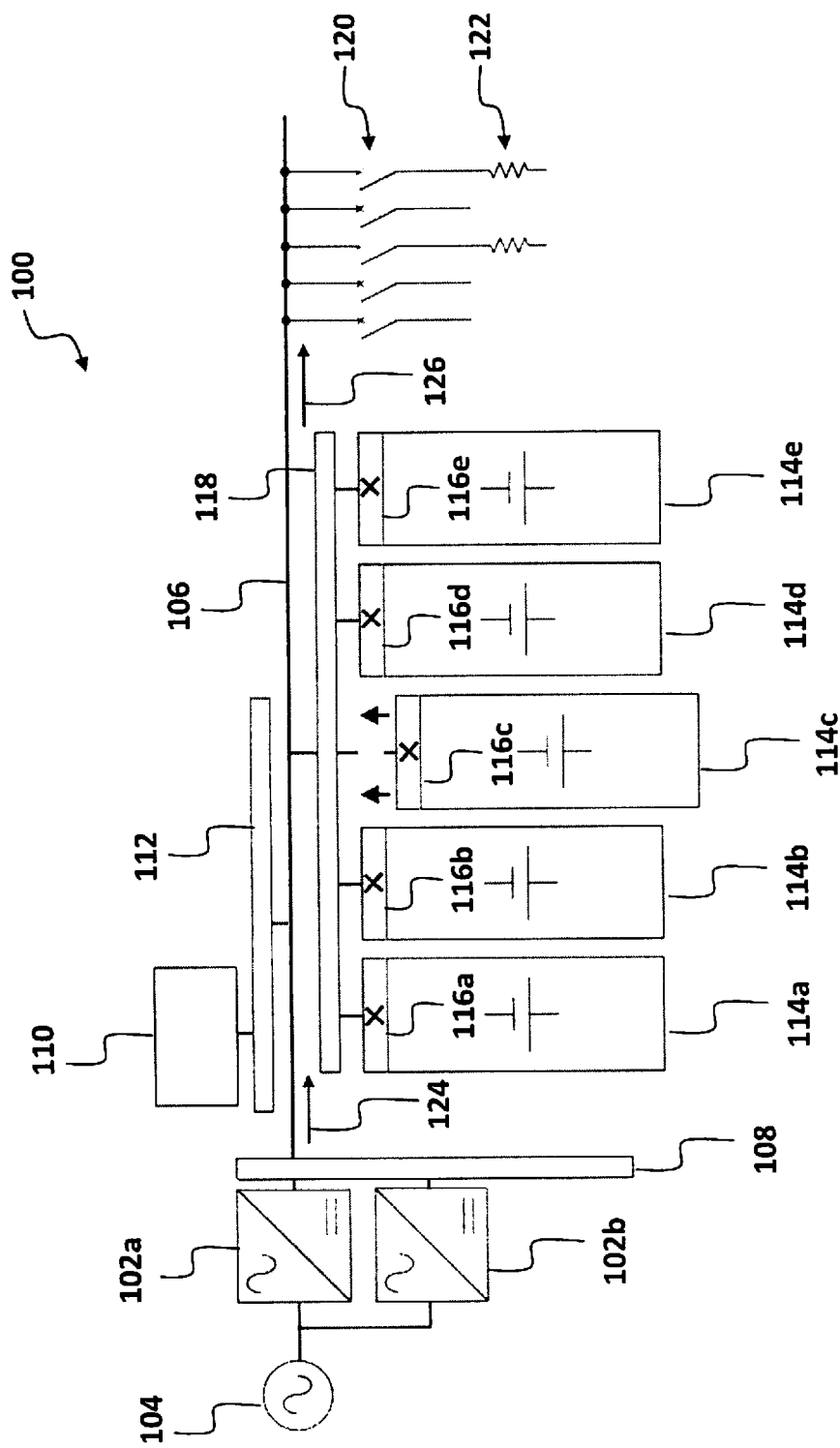
FIG. 10 is a block diagram showing the exemplary modular power system having a smart battery module inserted in a condition in which AC mains supply is present.

FIG. 10 is a block diagram of the system shown in FIG. 1, in which a smart battery module is being hot swapped into modular power system 100. The modular power system 100 is operating under normal conditions with AC power present and smart battery modules 114a, 114b, 114d and 114e in a float mode where they are charged and their decoupling units 116a, 116b, 116d, 116e are set to disconnected mode. This swapping scenario may occur, for example, if a faulty smart battery module is being replaced, or if spare smart battery modules are being cycled through the system to maintain their state of charge.

Figure 11:
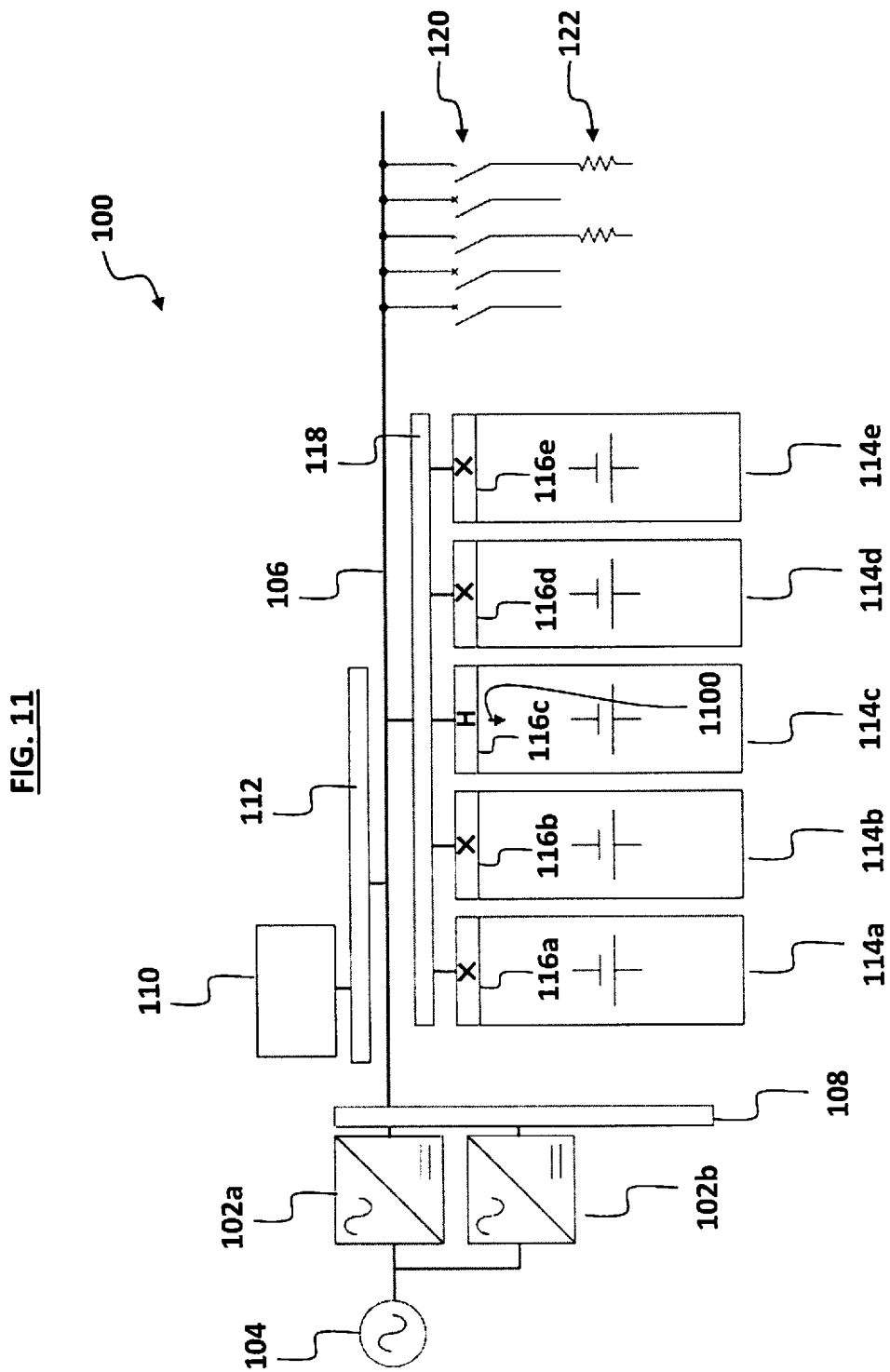
FIG. 11 is a block diagram showing the exemplary modular power system in a harmonization mode.

In FIG. 10 a smart battery module (not shown) has been disconnected from hot pluggable interface 118 and removed from the modular power system 100. Smart battery module 114c is being hot plugged into the hot pluggable interface 10. Once connected smart battery module 114c detects the voltage level of the DC bus, determines that AC power is present, and that smart battery modules 114a, 114b, 114d and 114e are installed. If the smart battery module 114c is charged and its terminal voltage is less than the connection threshold from the terminal voltages of smart battery modules 114a, 114b, 114d and 114e its decoupling unit 116c will remain in disconnected mode and it will enter float mode along with the other smart battery modules 114a, 114b, 114d and 114e. If the terminal voltage of smart battery module 114c is more than the connection threshold below the DC bus 106 voltage then the decoupling unit 116c is set to harmonization mode, this is shown in FIG. 11. In harmonization mode a trickle charge current 1100 flows into smart battery module 114c. The trickle charge current slowly charges the battery until the terminal voltage of smart battery module 114c raises to within the connection threshold of the DC bus 106. Once the terminal voltage of smart battery module 114c is within the connection threshold of the DC bus 106 decoupling unit 116c switches to connected mode and the full battery charging current can flow, as shown in FIG. 12. If the charging current exceeds the maximum charging current of the smart battery module the mains converters 102a, 102b are instructed by the control and monitoring module 110 to decrease the DC bus 106 voltage until the charging current is equal to a specified charging current. If the DC bus voltage is not dropped and the charging current remains above the maximum charging current of the smart battery module then the decoupling unit 114 of the smart battery module 116 reverts back to harmonization mode.

For a firmware and/or software (also known as a computer program) implementation, the techniques of the present disclosure may be implemented as instructions (for example, procedures, functions, and so on) that perform the functions described. It should be appreciated that the present disclosure is not described with reference to any particular programming languages, and that a variety of programming languages could be used to implement the present invention.

The firmware and/or software codes may be stored in a memory, or embodied in any other processor readable medium, and executed by a processor or processors. The memory may be implemented within the processor or external to the processor. A general-purpose processor may be a microprocessor, but in the alternative, the processor may be any processor, controller, microcontroller, or state machine. A processor may also be implemented as a combination of computing devices, for example, a combination of a digital signal processor (DSP) and a microprocessor, a plurality of microprocessors, one or more microprocessors in conjunction with a DSP core, or any other such configuration. The processors may function in conjunction with servers, whether cloud based or dedicated, and network connections as known in the art.

In various embodiments, one or more cloud computing environments may be used to create, and/or deploy, and/or operate at least part of the software system that can be any form of a cloud computing environment, for example: a public cloud, a private cloud, a virtual private network (VPN), a subnet, a Virtual Private Cloud (VPC), or any other cloud-based infrastructure known in the art. It should be appreciated that a service may utilize, and interface with, multiple cloud computing environments.

The steps of a method, process, or algorithm described in connection with the present disclosure may be embodied directly in hardware, in a software module executed by one or more processors, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The invention(s) may also be said broadly to consist in the parts, elements and features referred to or indicated in the specification of the application, individually or collectively, in any or all combinations of two or more of said parts, elements or features. Where in the foregoing description reference has been made to integers or components having known equivalents thereof, those integers are herein incorporated as if individually set forth. It should be noted that various changes and modifications to the presently preferred embodiments described herein will be apparent to those skilled in the art. Such changes and modifications may be made without departing from the spirit and scope of the disclosure and without diminishing its attendant advantages. It is therefore intended that such changes and modifications be included within the present disclosure.

Embodiments have been described by way of example only and it should be appreciated that modifications and additions may be made thereto without departing from the scope thereof. Reference throughout this specification to "one embodiment" or "an embodiment" (or the like) means that a particular feature, structure, or characteristic described in connection with the embodiment is included in at least one embodiment of the disclosure. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the foregoing description, numerous specific details are provided to give a thorough understanding of the exemplary embodiments. One skilled in the relevant art may well recognize, however, that embodiments of the disclosure can be practiced without at least one of the specific details thereof, or can be practiced with other methods, components, materials, et cetera. In other instances, well-known structures, materials, or operations are not shown or described in detail to avoid obscuring aspects of the invention.

Throughout this specification, the word "comprise" or "include", or variations thereof such as "comprises", "includes", "comprising" or "including" will be understood to imply the inclusion of a stated element, integer or step, or group of elements integers or steps, but not the exclusion of any other element, integer or step, or group of elements, integers or steps, that is to say, in the sense of "including, but not limited to".

The invention claimed is:

1. A modular power system comprising:
   at least one mains converter connected between a mains supply and a DC bus;
   a monitoring and control system connected to the DC bus; and
   a plurality of smart battery modules configured to be removably connected in parallel to the DC bus;
   wherein each smart battery module comprises a decoupling unit configured to electrically disconnect the smart battery module from, or connect the smart battery module to, the DC bus;
   wherein the monitoring and control system is configured to:
      monitor supply of mains power to the at least one mains converter;
      monitor a voltage of the DC bus;
      monitor a terminal voltage of each smart battery module;
      monitor a magnitude of a load that is present on the DC bus;
      control a DC output voltage of the at least one mains converter; and
      control the decoupling unit of each smart battery module to be in one of at least: a connected mode, and a disconnected mode; and
   wherein each decoupling unit is configured to be controllable to operate in a harmonization mode in which a limited current flow is permitted.

2. The modular power system of claim 1, wherein the at least one mains converter is a hot-swappable AC/DC rectifier.

3. The modular power system of claim 1, where functions of the monitoring and control system are distributed between two or more members selected from the group consisting of: the plurality of smart battery modules, the at least one main converter, and at least one control and monitoring module of the monitoring and control system.

4. The modular power system of claim 1, wherein the modular power system is configured to schedule at least one battery event selected from the group consisting of: periodic battery testing cycles, and battery charging cycles.

5. The modular power system of claim 1, wherein the monitoring and control system is configured to set at least one reference value within a memory of at least one smart battery module of the plurality of smart battery modules, wherein the at least one reference value comprises one or more items selected from the group consisting of: nominal charging current, trickle charging current, maximum charging current, nominal terminal voltage, low voltage disconnect voltage, self-discharge threshold, and connection threshold.

6. The modular power system of claim 1, wherein each smart battery module is configured to selectively operate in a charging mode.

7. The modular power system of claim 6, wherein the monitoring and control system is configured to adjust the DC bus voltage while the smart battery modules are in a charging mode, to provide a charging current that does not exceed a maximum charging current of the smart battery modules.

8. The modular power system of claim 1, wherein, in the harmonization mode, each smart battery module is configured to:
  determine deviation of its terminal voltage from the terminal voltage of other smart battery modules operating in the harmonization mode in the system; and
  control charge current in the smart battery module if the deviation is outside a predetermined voltage range, until the deviation is within the predetermined voltage range.

9. The modular power system of claim 1, wherein the monitoring and control system is configured to communicate with the one or more mains converter at least one item selected from the group consisting of: DC voltage set point levels for the DC bus, and disable/enable commands.

10. The modular power system of claim 1, wherein the monitoring and control system is configured to communicate with the smart battery modules at least one item selected from the group consisting of: connect/disconnect commands for the decoupling unit, set values for the amount of self-discharge allowable during a float mode before the smart battery module reconnects to the DC bus to recharge, terminal voltage set points, low voltage disconnect thresholds, maximum charge current, and maximum discharge current.

11. A smart battery module for a modular power system, the smart battery module comprising:
  a hot pluggable interface for connecting to a corresponding interface of the modular power system;
  a plurality of battery cells;
  a decoupling unit configured to electrically connect the battery cells to, or disconnect the battery cells from, the hot pluggable interface, and
  a battery module monitoring and control system, wherein the battery module monitoring and control system is configured to:
    determine a terminal voltage of the plurality of battery cells;
    control the decoupling unit to either disconnect, or connect, the battery cells in order to allow the supply of power to, or allow receipt of power from, a DC bus of the modular power system through the hot pluggable interface;
    switch the decoupling unit from connected to disconnected according to one or more of:
      a current flowing out of the battery cells exceeding a predefined discharge current threshold; or
      based on a combination of the magnitude of an over-current and a duration of the over-current;
    detect a presence of other smart battery modules connected to the modular power system; and
    after switching the decoupling unit from connected to disconnected, in response to detecting the presence of other smart battery modules, switch the decoupling unit from disconnected to connected.

12. The smart battery module of claim 11, wherein a default mode of the decoupling unit is to disconnect the smart battery module from the DC bus.

13. The smart battery module of claim 11, wherein the smart battery module is configured to enter into a float mode when the terminal voltage is within a predetermined voltage range of one or more of the other smart battery modules.

14. The smart battery module of claim 11, wherein the smart battery module is controllable to operate in a harmonization mode in which the battery module monitoring and control system is configured to:
  determine deviation of its terminal voltage from the terminal voltage of one or more of the other smart battery modules operating in the harmonization mode; and
  control charge current to the plurality of battery cells if the deviation is outside a predetermined voltage range, until the deviation is within the predetermined voltage range.

15. The smart battery module of claim 11, wherein the battery module monitoring and control system is configured to control the decoupling unit to connect the battery cells to the DC bus when the DC bus voltage drops below the terminal voltage by a predefined threshold.

16. The smart battery module of claim 11, wherein the decoupling unit is configured to be controllable to operate in a harmonization mode in which a limited current flow is permitted.

17. The smart battery module of claim 16, wherein the battery module monitoring and control system is configured to switch the decoupling unit from the connected mode to the harmonization mode if the current flowing into the smart battery module exceeds a predefined discharge current threshold.

18. A monitoring and control system for a modular power system, the monitoring and control system comprising:
  a hot pluggable interface configured for connection with a corresponding interface of the modular power system, wherein the monitoring and control system is configured to:
    monitor a voltage of a DC bus of the modular power system;
    determine whether any mains converters are installed in the modular power system and whether mains power is being supplied to those mains converters;
    determine a presence, and individual terminal voltage of, each of a plurality of smart battery modules connected to the modular power system;
    provide a DC level control signal to one or more mains converters installed in the modular power system; and
    determine that the terminal voltages of the plurality of smart battery modules are within a connection threshold to one another and, in response, instruct the plurality of smart battery modules to connect to the DC bus to provide power to the DC bus.

* * * * *

UNITED STATES PATENT AND TRADEMARK OFFICE
CERTIFICATE OF CORRECTION

PATENT NO. : 11,394,236 B2
APPLICATION NO. : 16/149734
DATED : July 19, 2022
INVENTOR(S) : Murray Raymond Wyma It is certified that error appears in the above-identified patent and that said Letters Patent is hereby corrected as shown below:

On the Title Page

Column 1, add the following:
--(30) Foreign Application Priority Data
Oct. 2, 2017 (NZ) ................................ 736016--

Signed and Sealed this
Fourth Day of October, 2022

Katherine Kelly Vidal
*Director of the United States Patent and Trademark Office*